UNITED STATES PATENT OFFICE.

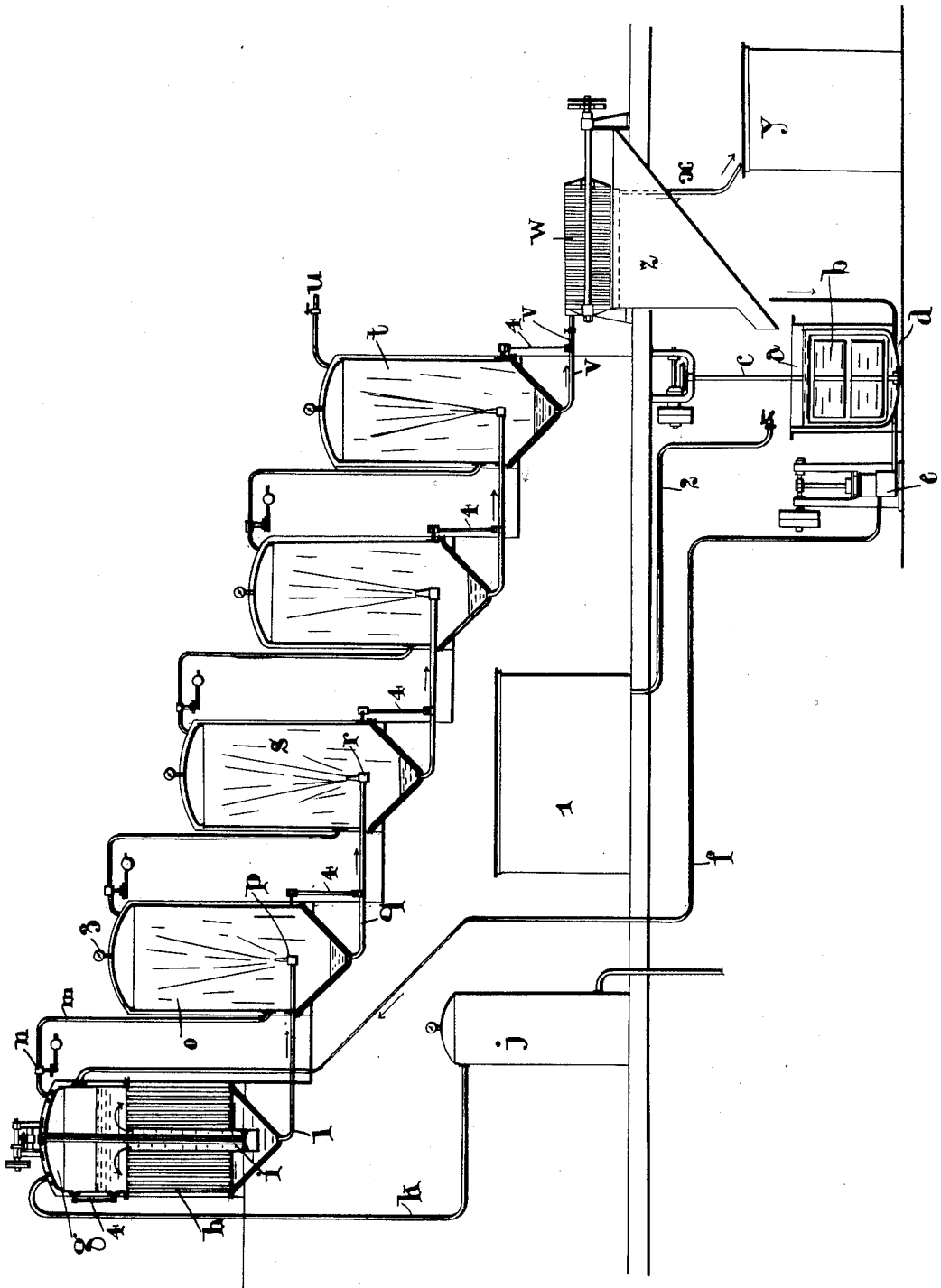

NILS TESTRUP, OF LONDON, ENGLAND, ASSIGNOR TO LEVER BROTHERS, LIMITED, OF PORT SUNLIGHT, ENGLAND.

TREATMENT OF OILS, FATS, AND THE LIKE.

1,114,067. Specification of Letters Patent. Patented Oct. 20, 1914.

Application filed March 20, 1911. Serial No. 615,559.

*To all whom it may concern:*

Be it known that I, NILS TESTRUP, a subject of the King of Great Britain and Ireland, and residing at 6 Broad Street Place, London, E. C., England, have invented certain new and useful Improvements in and Relating to the Treatment of Oils, Fats, and the like, of which the following is a specification.

This invention relates to the treatment of oils, fats and the like, this expression including unsaturated fatty acids and their glycerids *e. g.* such as are employed in the soap and candle industries.

The objects of this invention are to improve the quality and to alter as may be desired the properties of bodies as referred to, such as crude commercial oils and fats, more particularly by hardening the same, *i. e.* by altering their melting point and by deodorizing and bleaching the same.

Various proposals to convert unsaturated fatty acids or their glycerids into saturated bodies by subjecting them to the action of hydrogen in the presence of a finely divided metal acting as a catalyst have been made. In such processes the substance to be treated has either been passed as a vapor together with hydrogen over the catalyst or has been divided into drops and allowed to flow over the catalyst supported on pumace or other base in an atmosphere of hydrogen or hydrogen has been passed through the substance mixed with the catalyst.

This invention consists however in converting the substance to be treated mixed with the catalyst into a homogeneously atomized condition of minute subdivision in an atmosphere of hydrogen or of a hydrogen containing gas thus obtaining such an intimacy of contact of the substance to be converted with the catalyst and with the hydrogen gas that the speed and uniformity of the reaction and its thoroughness are very materially increased.

This invention also consists in a process for hardening of oils, fats or the like, consisting in atomizing the body previously melted if necessary in a suitable vessel, such as a jacketed vessel, provided with stirring means, together with the catalyst into a chamber into which hydrogen is passed, the treated material from the atomizer being projected into the chamber, and being withdrawn therefrom at the bottom either to be returned to the atomizing device or passed to other chambers for further treatment, or being separated from the contact body with which it is most intimately mixed.

This invention also consists in the improved processes and apparatus for the treatment of oils, fats and the like, hereinafter described.

In carrying out this invention according to one form employing the apparatus shown in the accompanying drawing and treating cotton-seed oil, the oil, mixed with a suitable contact substance, such as finely divided palladium or preferably nickel, is placed in a suitable vessel *a* provided for example with a stirring device *b* comprising blades or like elements fixed to a vertical and rotatable shaft *c* within it. The amount of nickel can be about 2–3% by weight. This vessel is preferably jacketed as at *d*, and is in a suitable manner heated by the passage of heated fluid through this jacket, say to about 160 degrees, Celsius. From this chamber the oil is pumped by a pump *e* through a conduit *f* and enters a vessel *g* which is jacketed and heated by tubes *h* being also provided with a mixing device comprising a central tube and propeller arrangement *i*. Hydrogen gas is supplied at high pressure from a reservoir *j* through a duct *k*. The vessel *g* has an educt *l* for the material under treatment at its base and an educt for hydrogen *m* provided with a loaded valve *n*. The duct *m* opens into a vessel *o* into which the oil from the vessel *g* is projected by the atomizing nozzle *p* attached to the end of the duct *l* by the pressure of the gas in the vessel *g*. The oil and catalyst thus exposed to the action of the gas subsequently fall into the base of the vessel *o* to be forced by the pressure of the gas therein through a duct *q* to a nozzle *r* in another vessel *s* wherein the operation is repeated. Several such vessels are arranged in this way in cascade all being jacketed to allow of maintaining any desired temperature, such a temperature can be for example 160° C. or thereabout. The last vessel *t* is provided with any suitable educt *u* for the gas and an educt *v* for the treated oil and catalyst which is passed to a filter press *w* in which the oil is separated from the catalyst the former passing by a duct *x* to a reservoir *y* and the catalyst being returned to the vessel *a* for which purpose the chute *z* may be utilized. A storage tank for the material awaiting treatment is indicated at 1 with its duct 2 leading to the vessel a. Gages for noting the pressure 3 and level gages 4 are also employed. The temperature for cotton seed oil at which the reaction is conducted is about 160–170° C. and the pressure of the hydrogen in $g$ may be about 15 atmospheres, in $o$ say 12 atmospheres, the difference in pressure producing the practically complete atomization of the material or substance acted upon. The pressure may similarly fall by 3 atmospheres for each vessel. It may be necessary to pass the substance again through the apparatus or to provide several systems of heaters and spraying devices in series in order to obtain the desired result. It has been in certain experiments found sufficient to atomize the substance 10 to 15 times to obtain a material suitable for soap manufacture.

The process can also be carried out in the following manner: A suitable quantity of cotton-seed oil, mixed with 2 or 3% of catalyst, is pumped into a heater similar to $g$ and brought to a temperature of 160 to 170° C. When this temperature is reached, the oil and catalyst are blown into a reaction chamber such as $o$ in the same manner as in the previous example. From the reaction chamber the oil is pumped back to the heater and this procedure is repeated till the desired degree of hardening has been reached. Instead of one there may be several reaction chambers arranged in such a manner, that the oil enters them, all simultaneously. It is preferable to have two heaters connected with the same set of reaction chambers in such a manner that one quantity of oil is treated in the reaction chambers and the first heater, while another quantity is pumped into and heated in the second heater. When the first quantity of oil has all been sprayed the connection between the first heater and the reaction chambers is shut off and the second heater connected with the reaction chambers. The second quantity of oil is now treated with hydrogen, while the first heater is being refilled. The separation of the oil and the catalytic substance is effected in the same manner as in the first example. Any suitable hydrogen containing gas may be employed as will be understood.

It is found to be possible by treating fatty substances according to the process of the present invention, substantially to harden the same, and to raise their melting points, thereby producing from oils or like bodies which have no considerable value, substances of enhanced commercial utility and worth. For example, soft liquid oils may be converted into hard oils of particular utility in the soap making industry, the conversion being both rapid and complete.

It will be understood that the forms of process above described are merely referred to by way of example, since it may be possible conveniently to vary the steps, for example, the treatment of the body preparatory to its subjection to the action of hydrogen, the manner of its homogeneous subdivision, the time and manner of the separation of the treated body from the contact body with which it is admixed, the length and temperature of treatment, without departing from the spirit of the present invention which resides in exposing the substance and the catalyst mixed together to the action of hydrogen in a state of such fine division as is obtained by an atomizing nozzle for the purpose above indicated.

Having now described my invention what I claim as new and desire to secure by Letters Patent is:—

1. A process for the treatment of organic substances consisting in exposing the substance mixed with a catalytic material to the action of hydrogen while being injected in a state of minute sub-division; as set forth.

2. A process for converting unsaturated organic substances into more fully saturated substances consisting in exposing the same admixed with a catalytic material injected in the form of mist to the action of hydrogen; as set forth.

3. A process for converting unsaturated oleaginous substances into more fully saturated substances consisting in mixing the same with a catalytic metal and spraying the same by injection into an atmosphere of hydrogen; as set forth.

4. A process for hardening fatty matters consisting in exposing the same mixed with a finely divided catalytic material injected in the form of a mist to the action of hydrogen, as set forth.

5. A process for the treatment of fatty matters consisting in mixing the same with finely divided catalytic metal heating the same to an elevated temperature and spraying the mixture by injection into an atmosphere of hydrogen.

6. A process for the treatment of fatty matters consisting in spraying the same by injection when admixed with a catalytic material into an atmosphere of hydrogen, removing the treated material and separating the catalytic substance from the fatty matter.

7. A process for the treatment of fatty matters consisting in mixing the same with a finely divided catalytic metal, heating the mixture to an elevated temperature, spraying the same by injection into an atmosphere of hydrogen, withdrawing the treated material and mechanically separating the catalyst from the fatty matter; as set forth.

8. A process for the treatment of fatty matters consisting in mixing the same with a finely divided catalytic metal, heating the mixture to an elevated temperature, spraying the same by injection into an atmosphere of hydrogen, withdrawing the treated material, and returning the same to the spraying device for further treatment; as set forth.

9. A process for the treatment of organic substances consisting in the introduction under pressure of the substance mixed with a catalytic material systematically and in a state of minute sub-division into an atmosphere of hydrogen whereby a product of uniform saturation is expeditiously obtained.

10. A process for the saturation of unsaturated fatty bodies consisting in intimately mixing the body to be treated with a catalyst, and forcing the mixture through a small orifice into a vessel containing hydrogen.

11. A process for the saturation of unsaturated fatty bodies, consisting in the mixing of the body to be treated with a catalyst, spraying the mixture into an atmosphere of hydrogen, withdrawing the mixture as it collects, and again spraying it into a hydrogen atmosphere.

12. A process for the saturation of unsaturated fatty bodies, consisting in mixing the substance to be treated with a catalytic material, and then injecting the mixture in a state of minute subdivision into an atmosphere containing hydrogen.

13. A process for the saturation of unsaturated fatty bodies, consisting in mixing the substance to be treated with a catalytic material, then injecting the mixture in a state of minute subdivision into an atmosphere containing hydrogen, and then separating the catalyst from the treated material.

14. A process for the saturation of unsaturated fatty bodies, consisting in mixing the substance to be treated with a catalytic material, and then injecting the mixture in a state of minute subdivision into a heated vessel containing hydrogen under pressure.

15. A process for the saturation of unsaturated fatty bodies, consisting in heating the substance to be treated and mixing it while heated with a catalytic material, and then injecting the mixture in a state of minute subdivision into an atmosphere containing hydrogen.

16. A process for the saturation of unsaturated fatty bodies, consisting in mixing the substance to be treated with a catalytic material, and then injecting the mixture in a state of minute subdivision, successively, into a series of vessels containing hydrogen under pressure, the pressure of the hydrogen decreasing as the material passes from one vessel to the next.

17. A process for the saturation of unsaturated fatty bodies, consisting in mixing the substance to be treated with about two or three per cent. by weight of a catalytic material, and then injecting the mixture in a state of minute subdivision into an atmosphere containing hydrogen.

18. A process for the saturation of unsaturated fatty bodies, consisting in mixing the body to be treated with a catalyst and injecting the mixture into successive atmospheres of compressed hydrogen of decreasing degrees of compression, the pressure of one hydrogen atmosphere being utilized for injecting into the succeeding one.

19. A process for homogeneously converting unsaturated organic bodies into more fully saturated bodies which consists in first intimately mixing catalytic material with the body and then injecting said mixture in a uniformly atomized form into an atmosphere containing hydrogen.

20. A process for homogeneously converting unsaturated fatty acids and their glycerids into more fully saturated bodies, which consists in first intimately mixing the unsaturated fatty acids and their glycerids with a finely divided catalyst and then injecting said mixture in a uniformly atomized form into an atmosphere containing hydrogen.

21. A process for homogeneously converting unsaturated organic bodies into more fully saturated bodies, which consists firstly, in intimately mixing the catalytic material with the body, secondly, injecting said mixture in a uniformly atomized form into an atmosphere containing hydrogen, and thirdly, in subjecting all the parts of the mixture undergoing saturation in a given atmosphere to the same character of saturation.

22. A process for converting unsaturated organic bodies into more fully saturated bodies, consisting firstly in intimately mixing the body or bodies to be treated with a catalyst and then atomizing said mixture into a vessel containing hydrogen.

In testimony whereof I affix my signature in the presence of two witnesses.

NILS TESTRUP.

Witnesses:
M. ATKINSON ADAM,
P. A. OUTHWAITE.

Copies of this patent may be obtained for five cents each, by addressing the "Commissioner of Patents. Washington, D. C."